May 26, 1970  R. L. HUBER  3,514,589
CONCEALED VEHICLE RUNNING LIGHT ASSEMBLY
Original Filed July 5, 1966
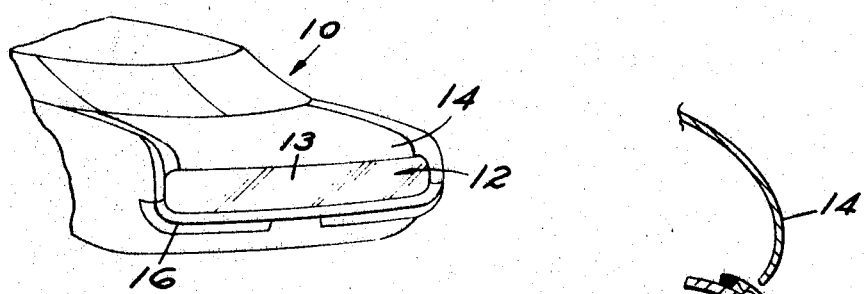
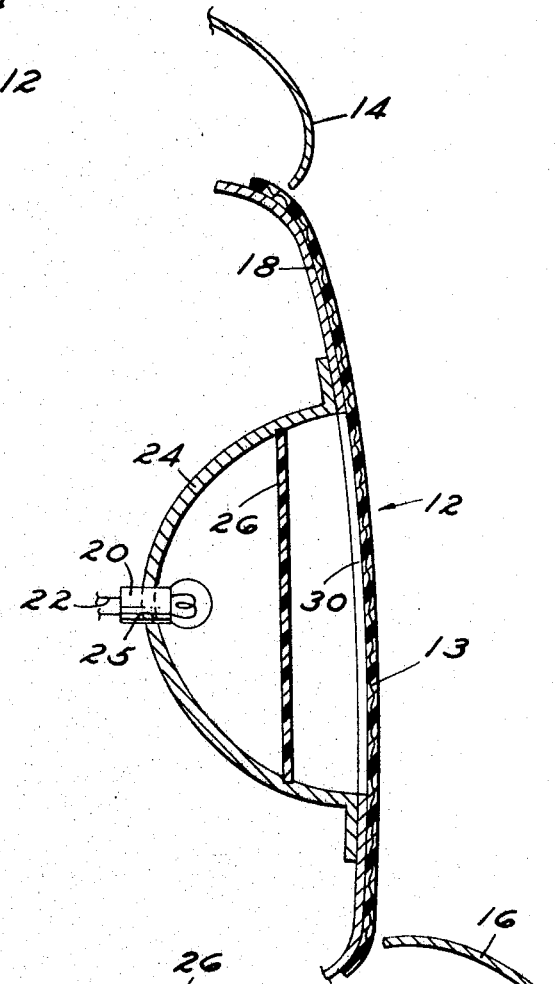
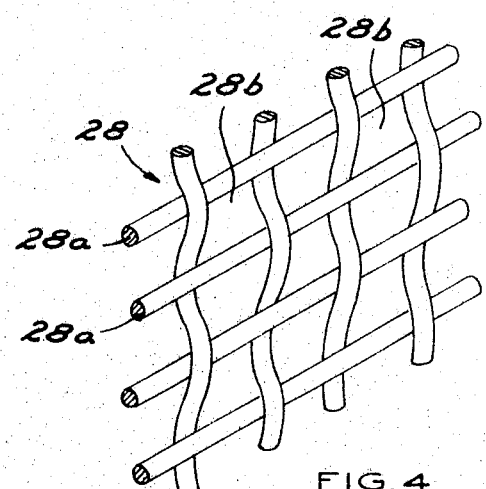
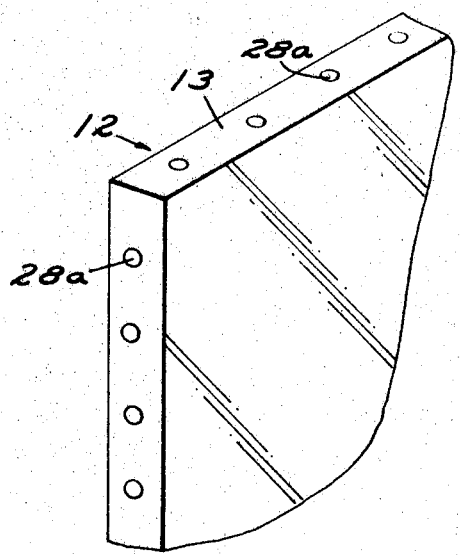
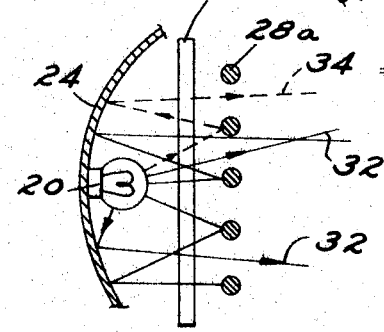
INVENTOR
ROY L. HUBER
BY
John R. Faulkner
Keith L. Zerschling
ATTORNEYS

United States Patent Office 3,514,589
Patented May 26, 1970

---

3,514,589
CONCEALED VEHICLE RUNNING LIGHT ASSEMBLY
Roy L. Huber, Romeo, Mich., assignor to Ford Motor Company, Dearborn, Mich., a corporation of Delaware
Continuation of application Ser. No. 562,566, July 5, 1966. This application July 25, 1969, Ser. No. 847,811
Int. Cl. F21v *9/08;* B60q *1/00*
U.S. Cl. 240—46.59                5 Claims

ABSTRACT OF THE DISCLOSURE

A concealed running light assembly wherein a light source carried by vehicle body structure is covered by a light permeable plastic panel. Coextensive with this panel and molded integrally therewith is an opaque color grid having a color identical to the paint color of the conventional opaque body panel surrounding the plastic panel. The opaque color grid is dimensioned so as to render a sufficient percentage area of the plastic panel opaque so that it appears to be a conventional opaque body panel when the light source is operative, but allows the passage of light therethrough when the light source is inoperative.

---

This application is a continuation of application Ser. No. 562,566 filed July 5, 1966, now abandoned.

BACKGROUND OF THE INVENTION

Vehicle running lights such as taillights and side marker lights long have presented a problem to the automotive stylist. These lights must be included on the vehicle body structure in such a manner that they readily are visible in order to perform the requisite signalling function when operative. It may be appreciated that this requirement limits the flexibility of the stylist in designing aesthetically pleasing vehicles.

It is an object of this invention to provide a vehicle running light assembly that is concealed from view when the running light source is inoperative. From exterior of the vehicle, the running light assembly of this invention then appears to be a conventional, opaque body panel. When the running light source becomes operative, however, the assembly of this invention allows the conventional signalling function of a running light to be performed.

It is a further object of this invention to provide a running light assembly for a motor vehicle that allows vehicle stylists to design a vehicle body shape without regard for the visual impact of included running lights since such lights are hidden from view when inoperative.

SUMMARY OF THE INVENTION

A concealed running light assembly constructed in accordance with this invention is adapted to be included in motor vehicle body structure having a plurality of exterior body panels, the exterior surfaces of which are covered with a decorative opaque coating. An additional exterior body panel contiguous to the plurality of panels is constructed of light permeable material. A light source is secured to the body structure interiorly of the light permeable additional panel and has an operative condition and an inoperative condition. Opaque color grid means extending essentially coextensive with the additional panel are joined therewith. These grid means allow light from the light source to pass through the panel when the light source is in an operative condition but cause the light permeable additional panel to appear to be opaque and the color of the grid means when the light source is in the inoperative condition. The opaque color grid means is identical in color to the opaque coating on the exterior surfaces of the plurality of surrounding panels.

DESCRIPTION OF THE DRAWING

FIG. 1 is an illustration of the rear of the motor vehicle having a concealed running light assembly constructed in accordance with this invention and adapted to function as a vehicle taillight;

FIG. 2 is a side elevation view, in section, of the concealed running light assembly of FIG. 1;

FIG. 3 is an isometric view of a portion of a running light concealing panel included in the assembly of FIG. 2;

FIG. 4 is an isometric view of a portion of a color grid means utilized in the practice of this invention; and FIG. 5 is a schematic view illustrating the passage of light from a light source through the color grid illustrated in FIG. 4.

Referring now in detail to the drawings, FIG. 1 illustrated a motor vehicle 10 having a concealed running light assembly including a decorative panel 12 that conceals the taillights of said vehicle. It may be seen that the panel 12 appears to the human eye to be constructed of material identical to the other vehicle body panels, such as the rear deck 14. Further, it may be seen that the use of the decorative panel 12 to conceal the vehicle taillights permits a clean and uncluttered appearance for the rear of the vehicle 10.

In FIG. 2 it may be seen that the panel 12 is located between the rear deck lid 14 and the bumper 16 of the vehicle and is mounted on one side of a supporting member 18. The other side of supporting member 18 mounts a suitable reflector 24, such as those well known in the art, that mounts a light source 20 in an aperture 25. Light source 20 is electrically connected to a suitable source of electrical energy by means of leads 22. A colored light filter 26 is mounted between light source 20 and panel 12.

The panel 12 may be constructed from any suitable transparent material, such as an acrylic plastic sheet 13 as illustrated. An opaque color grid 28, extending coextensively with sheet 13 and comprising wire cloth constructed of individual wire strands 28a, is shown molded integrally in the acrylic sheet 13. Color grid 28 is painted, as with enamel, a desired color such as a color identical to the other vehicle body panels and is dimensioned such that panel 12 is opaque over 30 to 50 percent of its area for reasons that will be discussed in detail below. The color grid also may comprise paint filled grooves in sheet 13 or embedded strands of wire painted a suitable color, as well as the wire cloth illustrated in the drawings. It is not necessary that the color grid be of a criss-cross configuration as shown in the drawings. A series of parallel color grid elements would suffice. Also, although the color grid is joined in close proximity with sheet 13, it is obvious that these two members need not actually be connected.

The wire cloth color grid 28 should be of a sufficiently small mesh, such as 30 mesh, so that the human eye will integrate the colored light reflected from the color grid, thereby giving the sheet 13 the appearance of a solid opaque member, the color of the color grid. Such construction of color grid 28 will cause the composite panel 12 to appear to the human eye to be identical with the other painted sheet metal body panels of the vehicle 10.

In certain usages of panel 12, such as when the color grid 28 is a light color tone, i.e. white, the transparency of the sheet 13 may allow light emitted from a source exterior of the vehicle to pass through the panel 12 and be reflected by the structure interior of said panel. This passage of light allows the image of the interior structure to be visible to the eye and would destroy the desired effect of concealing the vehicle taillight structure. The possibility of this condition existing is eliminated by coating the interior surface 30 of sheet 13 with a light diffusing substance that destroys the image of the interior assembly structure as reflected light passes from said structure through said coating. It may be said that such a coating renders the normally transparent sheet 13 translucent. A suitable light diffusing substance for this purpose is a microscopic glass bead coating available commercially as "Lenscreen" that may be spread on interior surface 30 of sheet 13.

When light 20 is inoperative, panel 12 reassembles the other painted sheet metal body members. However, when light source 20 becomes operative, light rays therefrom pass directly from light source reflector 24 through filter 26 where this light assumes the color of filter 26, such as red for a vehicle taillight. This light passing through filter 26 causes the projection of an image, corresponding to the shape of filter 26, on the surface 30. This colored light is also emitted through apertures 28b and thus passes through panel 12 and may be observed by the human eye exterior of the vehicle. Such light is illustrated schematically by the solid lines 32 in FIG. 5.

Other light rays, illustrated schematically by the dotted line 34 in FIG. 5, are emitted from light source 20 and reflected by wires 28a of the color grid 28 to reflector 24 and thence to the exterior of panel 12. Upon striking elements 28a, these light rays assume the color of elements 28a and are then subsequently colored by their double passage through filter 26. This light emerges from panel 12 with a different color than the light illustrated by lines 32. However, the intensity of light rays 32 are much greater in magnitude than light rays 34. The human eye thus perceives only light that is the true color of filter 26. The size mesh of the wire cloth is important in that it effects the percentage area of the panel 12 that is opaque, due to the presence of color grid elements 28, as compared to the percentage of panel 12 that is translucent due to the apertures 28b. As described above, this percentage opaqueness should be in the range of 30 to 50 percent in order that the human eye may integrate the light reflected from color grid elements 28a to a sufficient degree that the panel 12 appears to be a solid member, similar to the other painted sheet metal members of the motor vehicle.

It may thus be seen that this invention provides a concealed vehicle running light assembly that includes a seemingly opaque decorative panel that is, in actuality, partially translucent, thereby providing for the passage of light therethrough. These characteristics of the decorative panel constructed in accordance with this invention allow it to be used as a motor vehicle body member that will conceal the running lights of the vehicle when they are inoperative, while permitting intervehicular signals emitted from said lights to be perceived readily by the human eye.

I claim:

1. In a motor vehicle body structure, a plurality of exterior body panels, the exterior surfaces of said panels being covered with a decorative opaque coating, an additional exterior body panel contiguous to said plurality of panels, said additional body panel being light permeable, a light source secured to said body structure interiorly of said additional panel and having an operative condition and an inoperative condition and opaque color grid means essentially coextensive with said additional panel and joined therewith and allowing light from said light source to pass through said panel when said light source is in the operative condition while causing said additional panel to appear to be opaque and the color of said grid means when said light source is in the inoperative condition.

2. The combination of claim 1, wherein said opaque color grid means is identical in color to opaque coating on the exterior surfaces of said plurality of panels.

3. The combination of claim 1, wherein said addition panel is transparent and the surface of said additional panel nearest said light source has a coating of microscopic glass beads formed thereon rendering said additional panel translucent.

4. The combination of claim 1, wherein said additional panel is acrylic plastic and said opaque color grid means is painted wire cloth molded in said plastic to render said additional panel opaque over 30–50% of its area.

5. The combination of claim 1, including a colored light filter means mounted between said light source and said additional panel for color light from said light source prior to its passage through said additional panel.

References Cited

UNITED STATES PATENTS

| 1,618,010 | 2/1927 | Hoss | 240—46.39 |
| 2,836,707 | 5/1958 | Stitt | 240—1.1 |
| 2,907,246 | 10/1959 | Hjermstad | 350—106 |
| 2,933,595 | 4/1960 | Tabouret | 240—46.59 |
| 3,124,310 | 3/1964 | Lipscomb. | |
| 3,235,720 | 2/1966 | Bridge | 240—8.3 |
| 3,265,804 | 8/1966 | Berger et al. | 240—51.11 |

FOREIGN PATENTS 211,525 2/1924 Great Britain.

NORTON ANSHER, Primary Examiner

R. M. SHEER, Assistant Examiner

U.S. Cl. X.R.

240—46.39, 46.45, 7.1